April 29, 1924.
H. NEHLSEN
1,492,216
ALTERNATING CURRENT MOTOR
Filed March 16, 1923
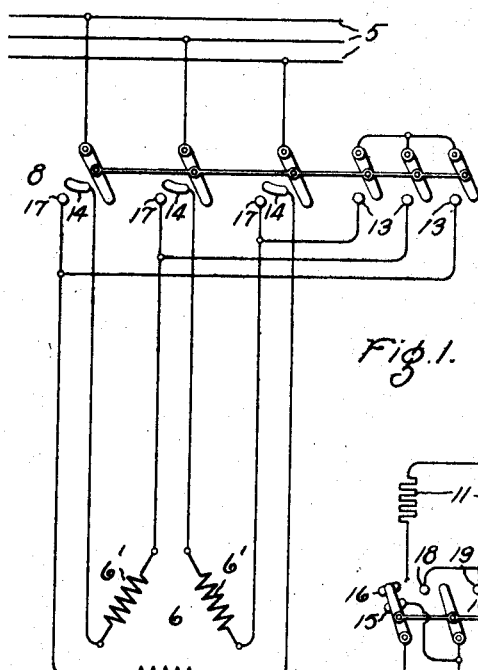
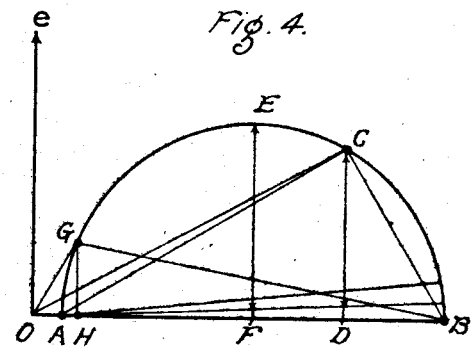
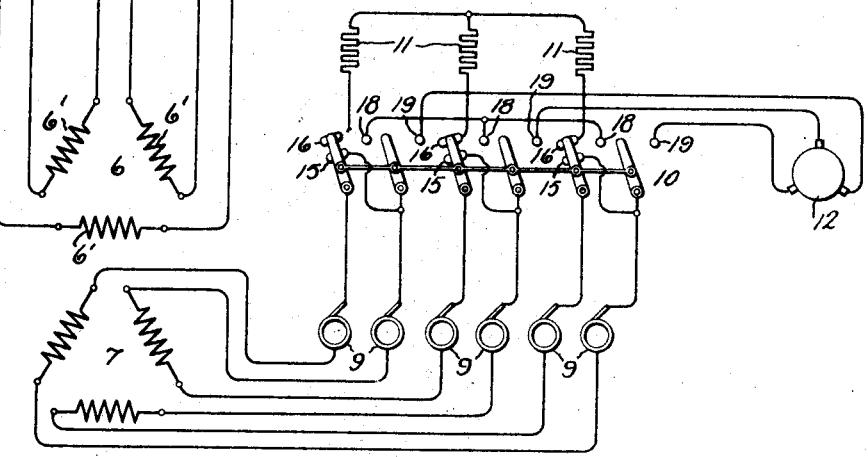
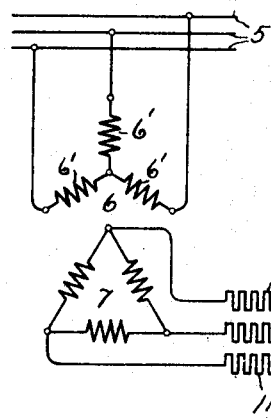
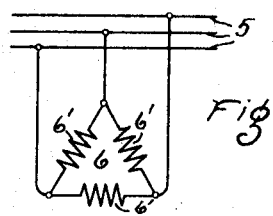
Inventor:
Hermann Nehlsen,
by
His Attorney.

Patented Apr. 29, 1924.

1,492,216

UNITED STATES PATENT OFFICE.

HERMANN NEHLSEN, OF WAIDMANNSLUST, GERMANY, ASSIGNOR TO GENERAL ELECTRIC COMPANY, A CORPORATION OF NEW YORK.

ALTERNATING-CURRENT MOTOR.

Application filed March 16, 1923. Serial No. 625,647.

*To all whom it may concern:*

Be it known that I, HERMANN NEHLSEN, a citizen of Germany, residing at Waidmannslust, Germany, have invented certain new and useful Improvements in Alternating-Current Motors, of which the following is a specification.

My invention relates to polyphase alternating current motors, and has for its object a novel method of interconnecting the primary and secondary windings of such a motor under starting and running conditions, so that voltage induced between the terminals of the secondary winding is low under starting conditions and high under running conditions.

When an alternating current motor is operated in accordance with my invention, the secondary winding can be wound for a high voltage with respect to its noload voltage than has heretofore been possible. This is particularly useful when the secondary winding is designed for direct current or alternating current excitation, as it enables the exciter to be designed to generate a higher voltage with a smaller current output than was heretofore possible.

The various features of novelty which characterize my invention are pointed out with particularity in the claim annexed to and forming a part of this specification. For a better understanding of my invention, reference may be had to the following description taken in connection with the accompanying drawing, in which Fig. 1 is a diagrammatic illustration of a motor designed for operation and constructed in accordance with my invention, and Figs. 2, 3 and 4 are explanatory diagrams.

Referring to Figs. 1 to 3, 5 represents an alternating current source, 6 the primary winding of an alternating current motor, and 7 the secondary winding of the motor. Means in the form of a switch 8 is provided in order to interconnect the primary winding so that the voltage applied to each coil 6' thereof is less for starting than for running and vice versa.

Means in the form of a switch 10 is provided, in order that the number of turns in series in the secondary circuit may be less under starting conditions than under running conditions and vice versa. The windings of the motor illustrated are shown as being three-phase. When the switch 8 is in the starting position, the contacts 13 are connected together and the contacts 14 are connected to the source of current 5. If the circuit of the windings is traced with the switch in this position, it will be seen that the primary winding 6 is connected to the source 5 in star as shown in the diagram of Fig. 2 and the voltage applied to each coil 6' is lower than under running conditions. The switch 10, in the position shown in Fig. 1, connects the contacts 15 and 16 together, and if the circuit connections are traced, it will be noted that the secondary winding 7 is connected in mesh, the collector rings 9 are connected to the resistance 11 and the number of turns in series in the secondary circuit is less than under running conditions. The resistance 11 may be gradually cut out of circuit in the usual manner. The connections of the secondary winding for starting are clearly shown in Fig. 2.

When the motor gets up to speed, the switch 8 is thrown to the extreme left position and the switch 10 thrown to the extreme right position. When the switch 8 is in the extreme left position, the circuit of contacts 13 are open and contacts 14 and 17 are connected together, and each pair are connected to one phase of the source of supply 5. The primary winding is then connected in mesh to the source 5 and the voltage applied to each coil 6' of the primary winding is higher than under starting conditions. When the switch 10 is thrown to the extreme right position, the contacts 18 are connected together, thus closing the star connection of the secondary winding, and the contacts 19 are connected to the exciter. The rotor windings are now connected in star to the exciter 12, as clearly shown in Fig. 3, and the number of turns in series in the secondary circuit is greater than under starting conditions.

Fig. 4 is a Heyland diagram of an induction motor. In this diagram the normal torque of the motor is represented by line GH, the primary current is represented by OG, and the secondary current by AG. If OB is the magnitude of the flux traversing the primary winding, then GB is substantially the flux traversing the secondary winding. The value of this flux, however, should be increased a small amount, that is, by the secondary stray flux. It will be seen from this, therefore, that the flux traversing the secondary winding is, when starting with normal torque, substantially equal to the flux traversing the primary winding. If, however, instead of starting the motor with normal torque equal to GH, the motor is started with the torque CD, which lies beyond the maximum or stalling torque EF, the flux traversing the secondary winding becomes essentially smaller than the flux traversing the primary winding. In the example chosen, the secondary flux is only half the primary flux, and the torque is about 2.2 times the normal. The current traversing the primary winding is about four times normal. If, therefore, the starting connections are as shown in Fig. 2, and a starting voltage per phase in the secondary of 1500 volts is allowed, then this would correspond with a no load voltage of 9000 on the primary winding with the running connections as shown in Fig. 3. If we disregard the effect of the currents flowing in the windings, the voltage across the slip rings, when the connections are changed from that shown in Fig. 2 to that shown in Fig. 3, changes in the relation of 3:1, which with the figures chosen would be reduced from 9000 to 3000 volts. But because of the rotor currents, the flux traversing the secondary winding is decreased by about the relation of the length of CB to the length of OB, that is, by one-half, and the slip ring voltage is accordingly decreased to 1500 volts. The relation between the current taken from the line and the starting torque is thus not influenced by the change of connections from that of Fig. 2 to that of Fig. 3, as both vary with the square of the change in voltage.

It will thus be seen that the exciter 12 may be designed to generate a voltage six times greater than and a current one-sixth as great as if the connections were not changed in accordance with my invention.

I desire it to be understood that the change of connections may be made in other ways than that shown and described, as for example, by connecting the coils of the windings in series and parallel groups; that my invention is not limited to three-phase machines, nor is it limited to alternating current motors designed for use with secondary exciting machines, and I aim in the appended claim to cover such modifications as well as any others which do not depart from the spirit and scope of my invention.

What I claim as new and desire to secure by Letters Patent of the United States, is:—

The method of operating an alternating current motor having polyphase primary and secondary windings, which consists in connecting said primary winding in star and said secondary winding in mesh for starting, and connecting said primary winding in mesh and said secondary winding in star for running.

In witness whereof, I have hereunto set my hand this 19th day of February, 1923.

HERMANN NEHLSEN.